(12) United States Patent
Gray et al.

(10) Patent No.: US 12,257,879 B2
(45) Date of Patent: Mar. 25, 2025

(54) AIR VENTING SYSTEM AND VENTING METHOD FOR A TRUCK

(71) Applicant: Ford Global Technologies, LLC, Dearborn, MI (US)

(72) Inventors: Jeffrey Gray, Dearborn, MI (US); Vince Anthony Chimento, Plymouth, MI (US); Eric R. Yerke, Redford, MI (US); Peter Joyce, Royal Oak, MI (US); Srinath Vijayakumar, Farmington, MI (US); Daniel Hewitt, Amherstburg (CA); Mukdam Kena, Commerce Township, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 875 days.

(21) Appl. No.: 16/889,186

(22) Filed: Jun. 1, 2020

(65) Prior Publication Data

US 2021/0370744 A1 Dec. 2, 2021

(51) Int. Cl.
*B60H 1/00* (2006.01)
*B60H 1/24* (2006.01)

(52) U.S. Cl.
CPC ..... *B60H 1/00564* (2013.01); *B60H 1/00378* (2013.01); *B60H 1/241* (2013.01); *B60H 1/248* (2013.01); *B60H 1/249* (2013.01)

(58) Field of Classification Search
CPC ........ B60H 1/248; B60H 1/249; B60H 1/241; B60H 1/00564; B60H 1/00378
USPC ........................................... 454/165
See application file for complete search history.

(56) References Cited

U.S. PATENT DOCUMENTS 3,236,169 A * 2/1966 Starnaman ............. B60H 1/248
                                                    454/165
6,004,202 A    12/1999 McCorkel et al.

FOREIGN PATENT DOCUMENTS

| CN | 107985022 A | * 5/2018 |
| JP | 2003063449 | 3/2013 |
| WO | 2010113967 | 10/2010 |

OTHER PUBLICATIONS

Honda, Ridgeline Service Manual, 2006-2008 (Year: 2006).*

* cited by examiner

*Primary Examiner* — Allen R. B. Schult
(74) *Attorney, Agent, or Firm* — Vichit Chea; Carlson, Gaskey & Olds, P.C.

(57) ABSTRACT

An air venting system includes, among other things. A box of a truck. The box provides a cargo area. The system further includes a cab back panel of the truck. The cab back panel has an exposed section that provides a front wall of the cargo area. The cab back panel has a hidden section outside the cargo area. An air extractor is held within the hidden section of the cab back panel.

20 Claims, 6 Drawing Sheets

AIR VENTING SYSTEM AND VENTING METHOD FOR A TRUCK

TECHNICAL FIELD

This disclosure relates generally to venting air from a passenger compartment of a truck and, more particularly, a truck having a unibody construction.

BACKGROUND

Conventional trucks have a body-on-frame construction where a cab and a box are attached to a vehicle frame. The cab is spaced a distance from the box, which results in a gap between the cab and the box. As required, an air extractor can vent air from a passenger compartment of the cab into the gap.

Trucks having a unibody construction may not include a gap an open area between the cab and the box, nor a vehicle frame separate from the cab and the box. Accordingly, some trucks having a unibody construction include an air extractor that vents air into a cargo area of the box. The air extractor can be covered by a bed liner.

SUMMARY

An air venting system according to an exemplary aspect of the present disclosure includes, among other things, a box of a truck. The box provides a cargo area. The system further includes a cab back panel of the truck. The cab back panel has an exposed section that provides a front wall of the cargo area. The cab back panel has a hidden section outside the cargo area. An air extractor is held within the hidden section of the cab back panel.

In a further exemplary embodiment of the foregoing system, the air extractor opens to an area that is outside the cargo area such that the air extractor is configured to vent air from a passenger compartment of the truck to an area that is outside the cargo area.

In a further exemplary embodiment of any of the foregoing systems, the air extractor is held within the hidden section of the cab back panel at a position that is vertically beneath a floor of the box such that the air extractor is configured to vent air from a passenger compartment of the truck to an area vertically beneath the floor of the box.

In a further exemplary embodiment of any of the foregoing systems, the floor of the box is vertically elevated relative to a floor of the passenger compartment.

In a further exemplary embodiment of any of the foregoing systems, the air extractor is held within the hidden section of the cab back panel at a position that is outboard of the cargo area such that the air extractor is configured to vent air from a passenger compartment of the truck to an area outboard the cargo area.

A further exemplary embodiment of any of the foregoing systems includes a side wall of the box. The side wall has an inner panel and an outer panel. The air extractor opens to an area between the inner panel and the outer panel such that the air extractor is configured to vent air from the passenger compartment to the area between the inner panel and the outer panel.

In a further exemplary embodiment of any of the foregoing systems, the outer panel includes a rear wheel opening that communicates air from the area between the inner panel and the outer panel to an area outside the truck.

In a further exemplary embodiment of any of the foregoing systems, the air extractor is a side air extractor. The system then further includes a lower air extractor that is held within another portion of the hidden section of the cab back panel at a position that is vertically beneath a floor of the box such that the lower air extractor is configured to vent air from a passenger compartment of the truck to an area vertically beneath the floor of the box.

In a further exemplary embodiment of any of the foregoing systems, the side air extractor is a driver side air extractor that is configured to vent air from the passenger compartment to the area between the inner panel and the outer panel on a driver side of the cargo area. The system further includes a passenger side air extractor that is held within another portion of the hidden section and is configured to vent air from the passenger compartment to an area that is between an inner panel and an outer panel of a side wall on a passenger side of the cargo area.

In a further exemplary embodiment of any of the foregoing systems, the air extractor is configured to vent air from the passenger compartment into an interior of a cross-member that extends in a cross-vehicle direction. The cross-member has a box section.

In a further exemplary embodiment of any of the foregoing systems, the air extractor is a lower air extractor and the cross-member is a lower cross-member. The system further includes an upper air extractor held within the exposed section of the cab back panel and configured to vent air from the passenger compartment into an interior of an upper cross-member that extends in a cross-vehicle direction.

In a further exemplary embodiment of any of the foregoing systems, the hidden section of the cab back panel provides one side of the lower cross-member, and the exposed section of the cab back panel provides one side of the upper cross-member.

In a further exemplary embodiment of any of the foregoing systems, the exposed section of the cab back panel is exposed within the cargo area and is uncovered by any bed liner.

In a further exemplary embodiment of any of the foregoing systems, the truck has a unibody construction.

An air venting system according to another exemplary aspect of the present disclosure includes, among other things, a box of a unibody truck. The box provides a cargo area. The system further includes a cab back panel of the unibody truck, and a support panel extending longitudinally in a cross-vehicle direction. The support panel is joined to the cab back panel to provide a cross-member. The system still further includes an air extractor held within the cab back panel. The air extractor is configured to vent air from a passenger compartment of the unibody truck into an interior of the cross-member.

In another exemplary embodiment of the foregoing system, the support panel is an upper support member, the air extractor is an upper air extractor, and the cross-member is an upper cross-member. The interior of the upper cross-member is vertically above a floor of the box such that the upper air extractor vents air from the passenger compartment of the unibody truck into the interior of the upper cross-member at a position vertically above the floor of the box. The system then further includes a lower support panel extending longitudinally in a cross-vehicle direction and a lower air extractor. The lower support panel is joined to the cab back panel to provide a lower cross-member vertically beneath the floor of the box. The lower air extractor is configured to vent air from the passenger compartment of the unibody truck to an interior of the lower cross-member at a position that is vertically beneath the floor of the box.

A venting method for a passenger compartment of a truck according to yet another exemplary aspect of the present disclosure includes using a back panel of a cab as a front wall of a cargo area within a box, and venting air from a passenger compartment through an air extractor held by the back panel. The air is vented through the air extractor to an area outside the cargo area of the box.

In another exemplary embodiment of the foregoing method, the area outside the cargo area of the box is vertically beneath a floor of the box.

In another exemplary embodiment of any of the foregoing methods, the area outside the cargo area of the box is between an inner panel and an outer panel of a side wall of the box.

In another example embodiment of any of the foregoing methods, the truck is a truck having a unibody construction.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details exemplary venting systems and methods utilized to vent air from a passenger compartment of a truck. At least one air extractor provides a path for the venting. The truck can be a unibody truck.

Figure 1:
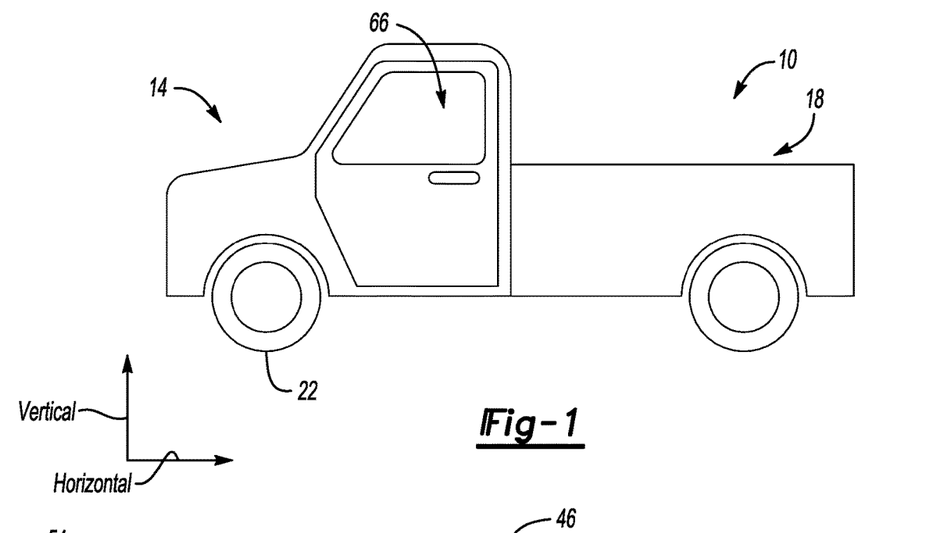
FIG. 1 schematically illustrates a truck having a unibody construction.

A truck 10 according to an exemplary aspect of the present disclosure is shown in FIG. 1. The truck 10 has a cab 14 and a box 18 that are supported on wheels 22. The truck 10 has a unibody construction. Accordingly, in the exemplary embodiment, the cab 14 and the box 18 are not supported on a vehicle frame that is separate and distinct from the cab 14 and the box 18.

With reference now to FIGS. 2-7 and continued reference to FIG. 1, the box 18 provides a cargo area 30. The box 18 includes a floor 34 that extends in a cross-vehicle direction between a driver side sidewall 38 and a passenger side sidewall 42. The floor 34 defines a bottom of the cargo area 30 in a Z or vertical direction. The driver side sidewall 38 and the passenger side sidewall 42 establish the respective outboard sides of the cargo area 30.

Figure 2:
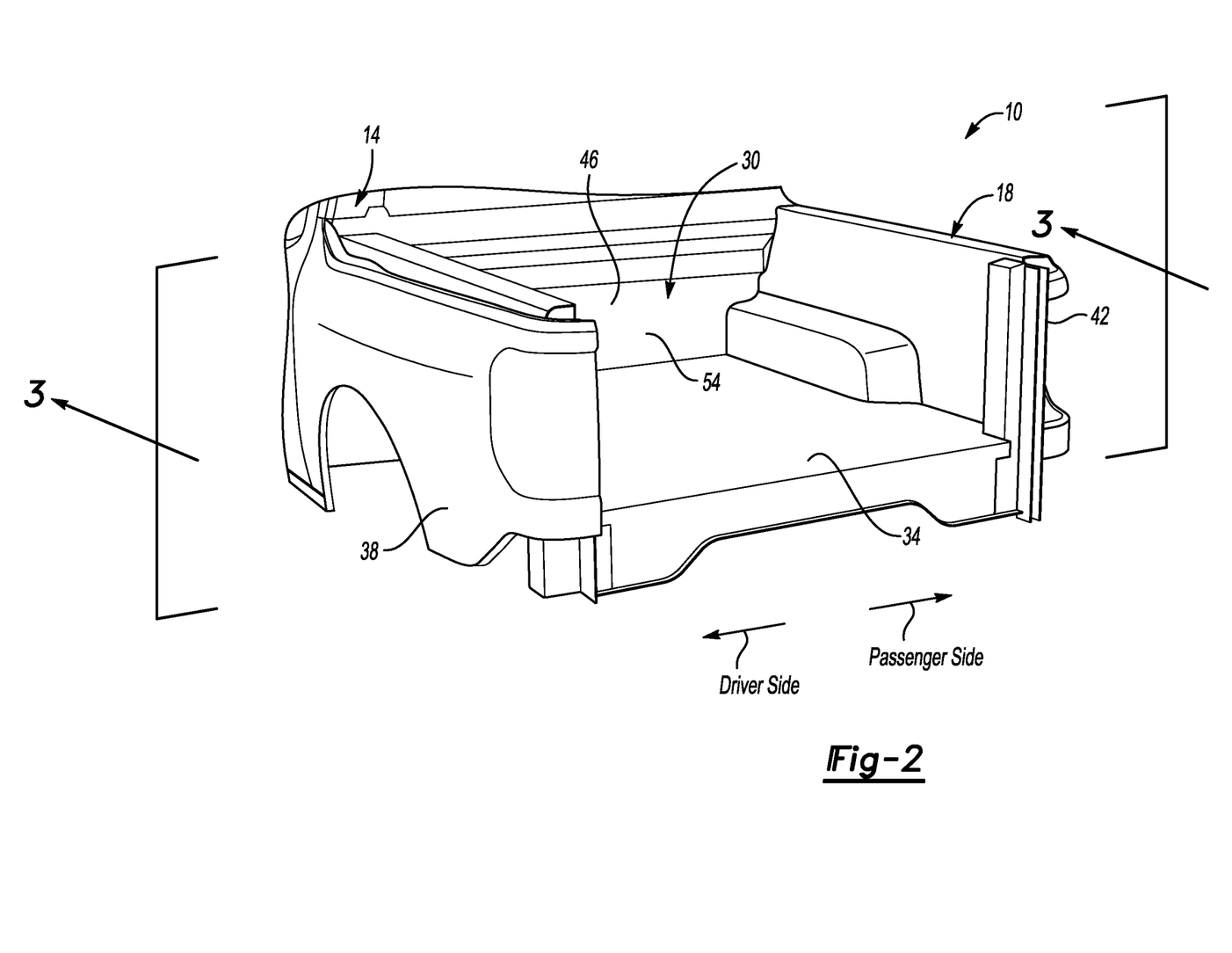
FIG. 2 illustrates a perspective view of a portion of the truck of FIG. 1 showing a cargo area of the truck according to an exemplary embodiment of the present disclosure.

A front wall 46 establishes a forward boundary of the cargo area 30. The front wall 46 of the cargo area 30 is generally aligned with a C-pillar of the truck 10.

A pivotable tailgate (not shown) can establish a rear boundary of the cargo area 30 when the tailgate is in a closed position. The rear of the cargo area 30 is generally aligned with a D-pillar of the truck 10.

In this example, the front wall 46 is provided by an exposed section 50 of a cab back panel 54, which also provides a rear side or boundary of the cab 14. Thus, the same panel that provides a rear side of the cab 14 provides the front wall 46 of the cargo area 30.

In addition to the exposed section 50, the cab back panel 54 includes a hidden section 58. The hidden section 58 does not provide the forward boundary of the cargo area 30 as the hidden section 58 is below the cargo area 30, outboard the cargo area 30, or both.

Figure 6:
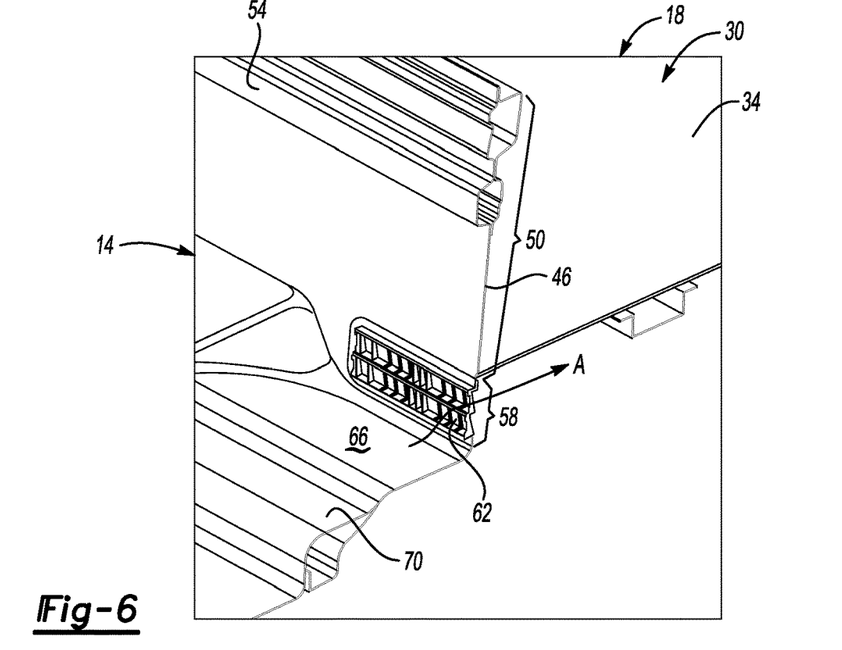
FIG. 6 illustrates a perspective, section view taken at line 6-6 in FIG. 5.
Figure 7:
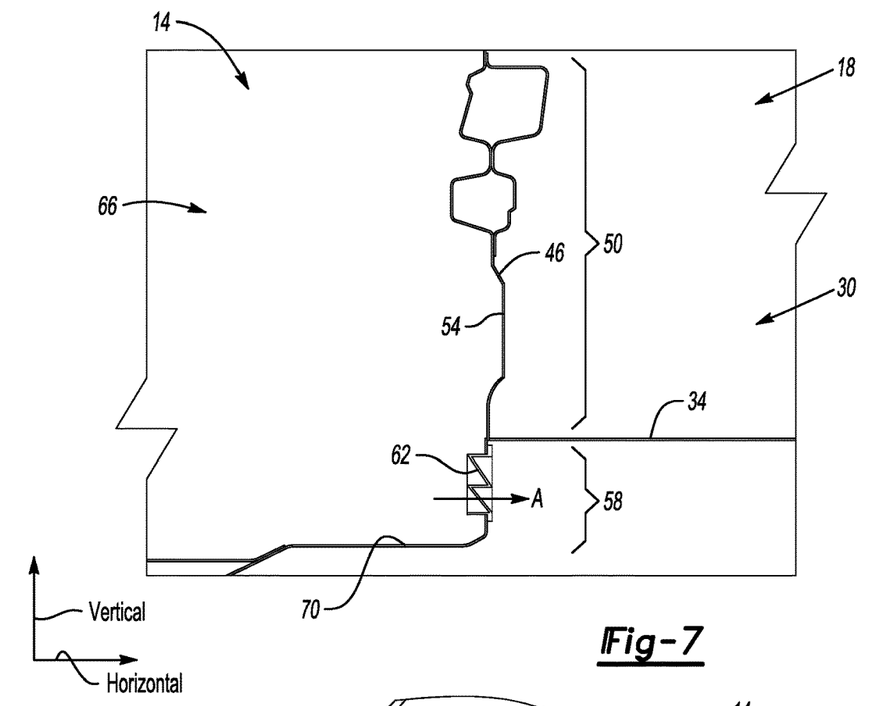
FIG. 7 illustrates a side view of the section view of FIG. 6.

In this example, as shown in FIGS. 6 and 7, some of the hidden section 58 extends vertically downward from the exposed section 50. This area of the hidden section 58 is vertically beneath the floor 34. In contrast, the exposed section 50 is vertically above the floor 34 to provide the front wall 46 of the cargo area 30.

For purposes of this disclosure, vertical is with reference to ground and the general orientation of the truck 10 during ordinary operation. Similarly, forward and rear are with reference to the orientation of the truck 10.

As the cab back panel 54 provides the front wall 46 of the cargo area 30, there is no gap between the cab back panel 54 and a front wall of the cargo area 30. In contrast to the truck 10 having a unibody construction, a truck having a body-on-frame construction would include a first panel providing the cab back panel, and a second panel providing a front panel of the bed. The first panel is spaced along a longitudinal axis of the body-on-frame truck from the second panel to provide a gap between the first panel and the second panel.

Referring again to the truck 10, an air extractor 62 is held within the hidden section 58 of the cab back panel 54. The air extractor 62 within the cab back panel 54 provides part of an air venting system for the truck 10.

The cab 14 includes a passenger compartment 66. The cab back panel 54 establishes a rearmost panel of the passenger compartment 66. The air extractor 62 can vent air A from within the passenger compartment 66 to an area that is outside the cargo area 30 as shown schematically in FIG. 4.

As the air extractor 62 is held within the hidden section 58, the air extractor 62 opens to an area that is outside the cargo area 30. In particular, in this example, the air extractor 62 is configured to vent air A between the passenger compartment 68 of the truck 10 and an area that is vertically beneath the floor 34 of the box 18. This is because the air extractor 62 of the exemplary embodiment is held within a portion of the hidden section 58 of the cab back panel 54 that is beneath the floor 34 of the box 18, The air extractor 62 can include a plurality of individual flaps that open in response to a pressure differential between the passenger compartment 66 and the area beneath the floor 34 of the box 18. A user closing a door of the cab 14, for example, may cause a pressure within the passenger compartment 66 to increase. The increase can force open flaps of the air extractor 62, which enables the venting of air A from the passenger compartment 66 through the air extractor 62 to the area beneath the floor 34 of the box 18.

The air extractor 62 is configured such that the flaps close when the pressure differential is not above a threshold level. When closed, the flaps can block debris and fluid outside the passenger compartment 66 from entering the passenger compartment 66 through the air extractor 62.

Figure 3:
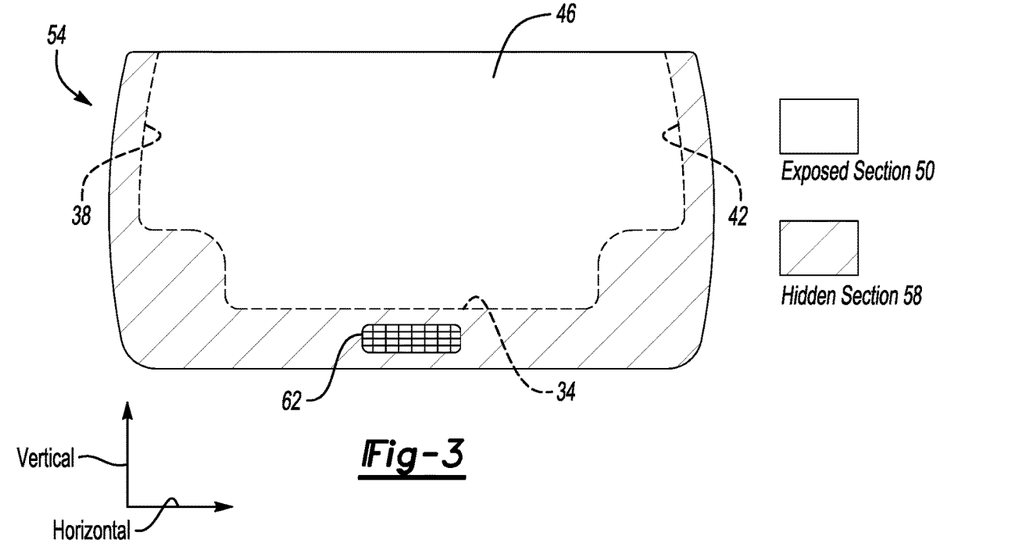
FIG. 3 illustrates a schematic section view taken at line 3-3 in FIG. 2.
Figure 4:
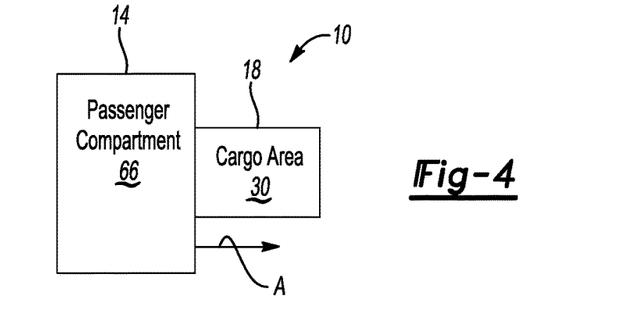
FIG. 4 illustrates a highly schematic representation of a passenger compartment and a cargo area from the truck of FIG. 1.
Figure 5:
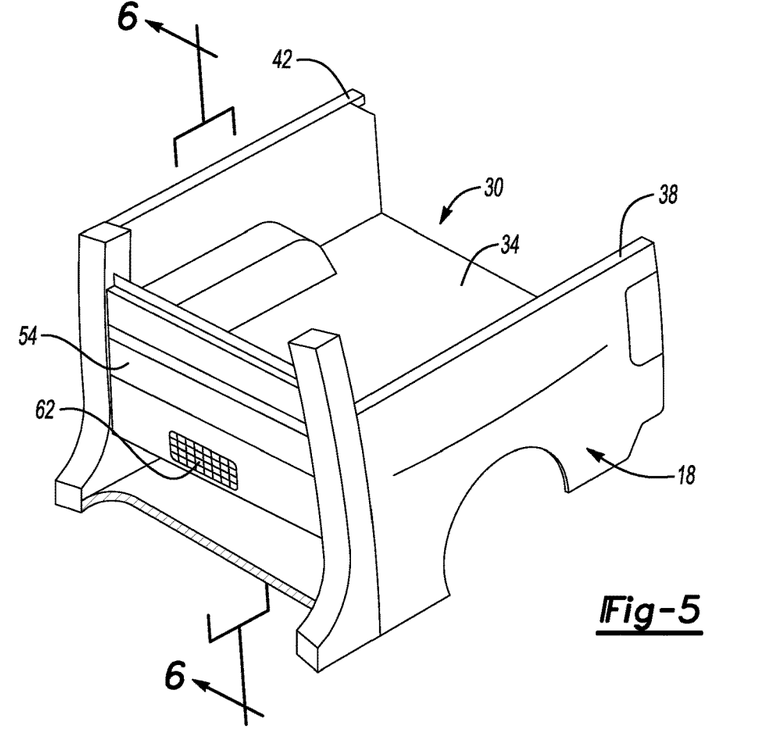
FIG. 5 illustrates another perspective view of a portion of the truck of FIG. 1 showing an air venting system according to an exemplary embodiment of the present disclosure.

With particular reference to FIGS. 3 and 7, the floor 34 of the box 18 is elevated vertically with respect to a floor 70 of the cab 14 providing the passenger compartment 66. This facilitates venting as the hidden section 58 is able to extend vertically beneath the floor 34 enough to hold the air extractor 62.

Figure 8:
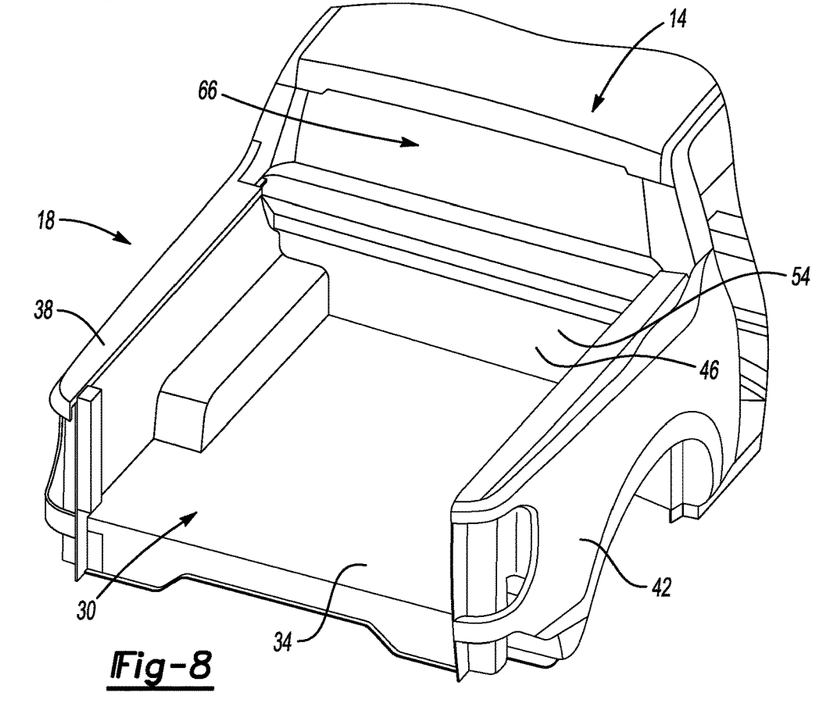
FIG. 8 illustrates another perspective view of the cargo area of FIG. 2.
Figure 9:
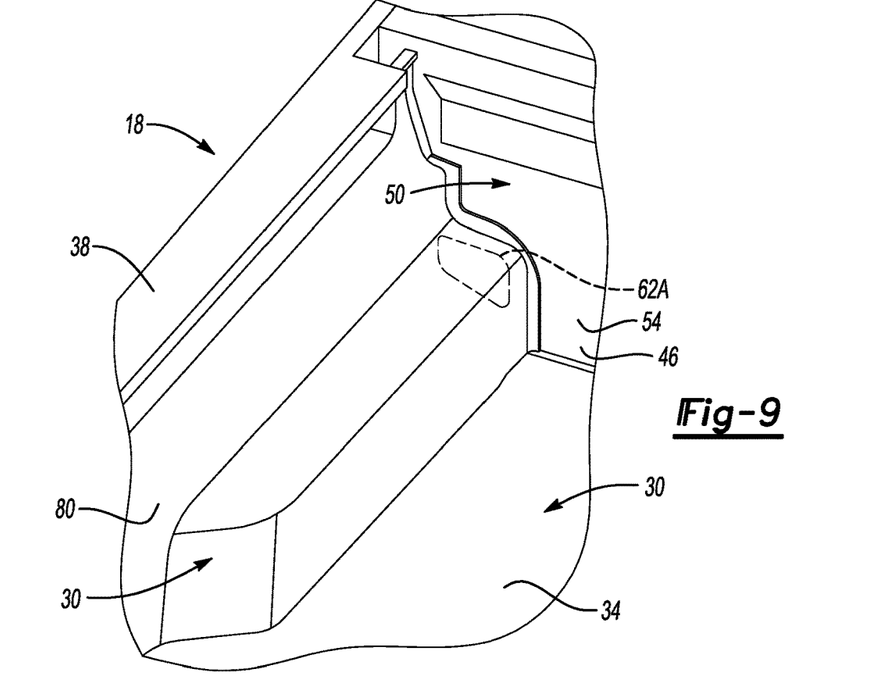
FIG. 9 illustrates a close-up view of a portion of FIG. 8 showing a side wall of a box of the truck.
Figure 10:
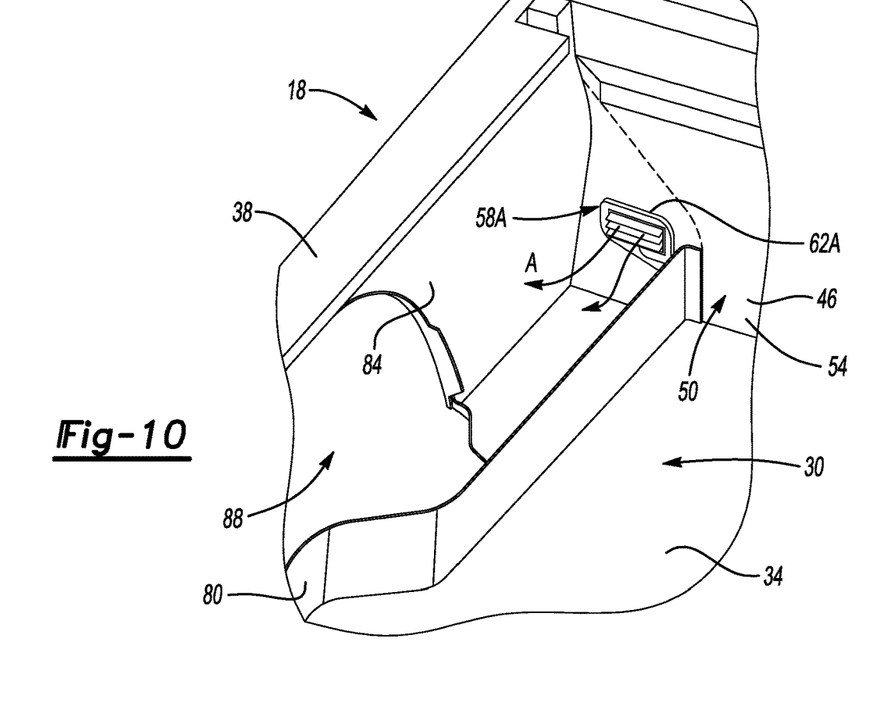
FIG. 10 illustrates the view of FIG. 9 with an inner panel of the side wall cut away to show an air extractor according to another exemplary embodiment of the present disclosure.

With reference now to FIGS. 8-10, an air extractor 62A according to another exemplary aspect of the present disclosure is held within a hidden section 58A of the cab back panel 54. The hidden section 58A is at a position that is outboard of the cargo area 30 such that the air extractor 62A is configured to vent air A from the passenger compartment 66 provided by the cab 14 to an area that is outboard the cargo area 30.

In particular, the area that is outboard of the cargo area 30 is between an inner panel 80 of the driver side sidewall 38 and an outer panel 84 of the driver side sidewall 38. The air extractor 62A opens to the area between the inner panel 80 and the outer panel 84 of the driver side sidewall 38.

After the air A moves from the passenger compartment 66 through the air extractor 62A to the area between the inner panel 80 and the outer panel 84, the air A can pass through a rear wheel opening 88 to an area outside the truck 10.

The air extractor 62A can be considered a side air extractor. The air extractor 62 of FIGS. 3-7 can be considered a lower air extractor. In some examples, the side air extractor 62A is used together with the lower air extractor 62 such that air A can be vented through air extractors 62 and 62A to areas beneath the floor 34 of the cargo area 30 and areas outboard the cargo area 30.

The air extractor 62A is shown on a driver side of the truck 10 and as opening to the driver side sidewall 38. The truck 10 could include another side air extractor on the passenger side of the truck 10 that opens to an area between an inner panel and an outer panel of the passenger side sidewall 42.

Figure 11:
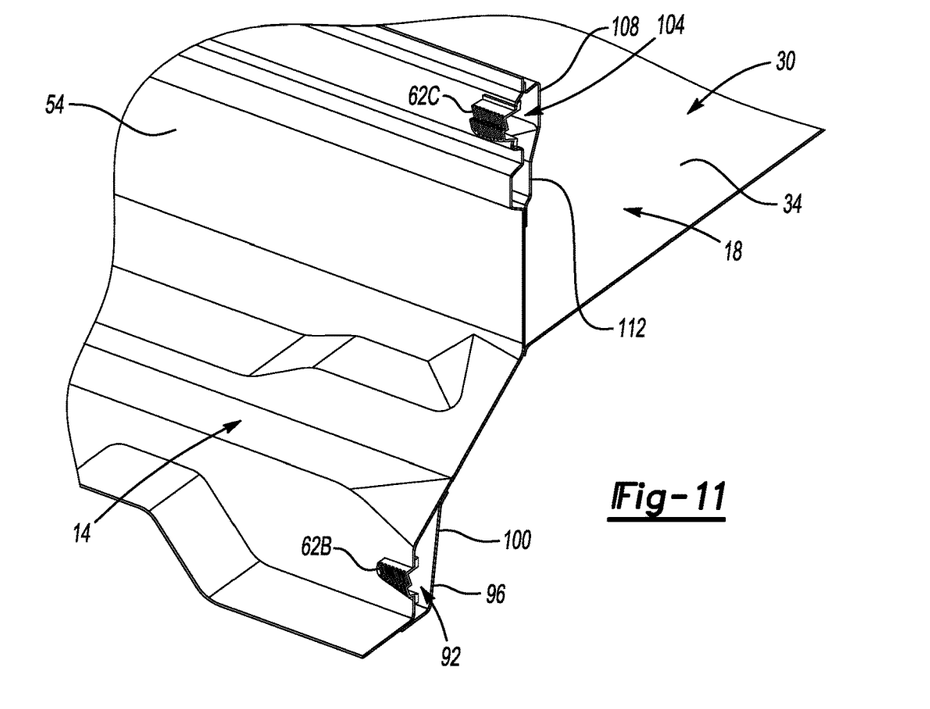
FIG. 11 illustrates a perspective, section view taken at the position of the line 6-6 in FIG. 5 of an air venting system according to yet another exemplary embodiment of the present disclosure.
Figure 12:
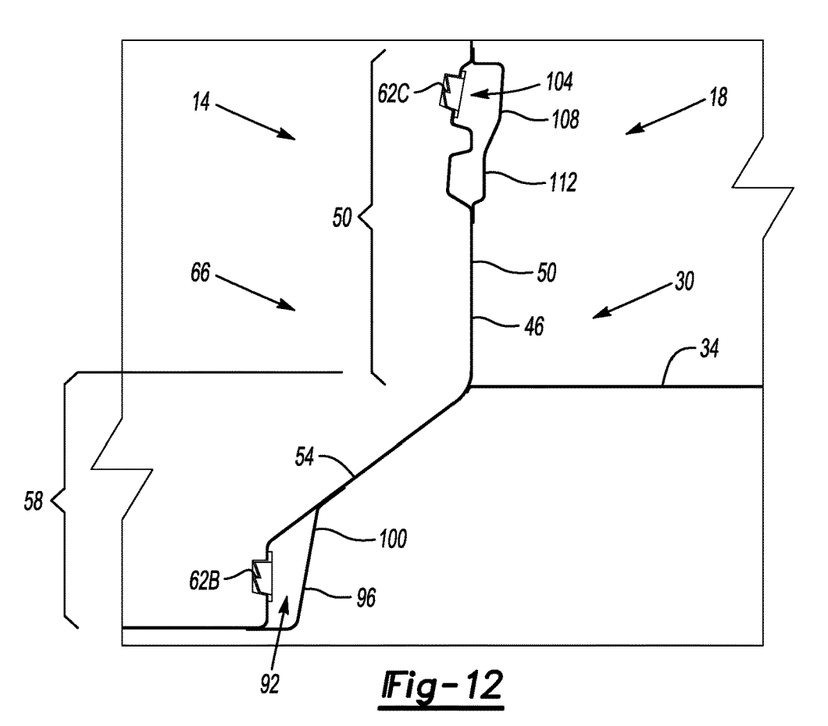
FIG. 12 illustrates a side view of the section view in FIG. 11.

FIGS. 11 and 12 show an air venting system according to yet another exemplary embodiment of the present disclosure. The air venting system includes an air extractor 62B and an air extractor 62C.

The air extractor 62B opens to an interior 92 of a cross-member 96 that extends in a cross-vehicle direction. The cross-member 96 has a box section. A forward side of the cross-member 96 is provided by the cab back panel 54. A support panel 100 can be attached to the cab back panel 54 to complete the box section of the cross-member 96. The support panel 100 extends longitudinally in a cross-vehicle direction.

Air can vent through the air extractor 62B from the passenger compartment 66 into the interior 92 of the cross-member 96. The portion of the cab back panel 54 that provides some of the cross-member 96 is within the hidden section 58 of the cab back panel 54 as this area of the cab back panel 54 is vertically beneath the floor 34 of the box 18.

The air extractor 62B can be considered a lower air extractor and used within the air venting system along with the air extractor 62C. The air extractor 62C can then be considered an upper air extractor relative to the lower air extractor 62B.

The upper air extractor 62C can vent air from the passenger compartment 66 into an interior 104 of a cross-member 108. The exposed section 50 of the cab back panel 54 provides generally one side of the cross-member 108. A support panel 112 can be secured to the exposed section 50 of the cab back panel 54 to complete a box section for the cross-member 108. The support panel 112 can extend longitudinally in a cross-vehicle direction. The cross-member 108 can be considered an upper cross-member, while the cross-member 96 is a lower cross-member.

In the above embodiments, the exemplary air extractors 62-62C do not open to the cargo area 30. Thus, the likelihood of damage to the air extractors 62-62C due to, for example, cargo loaded within the cargo area 30 is reduced. Further, since the air extractors 62-62C are concealed and substantially hidden from view, no bed liner is required to cover the air extractors for aesthetic reasons. In the exemplary embodiments, the air extractors 62-62C are uncovered by any bed liner within the cargo area 30. Also, since the exemplary air extractors 62-62C do not open to the cargo area, the venting of air A through the air extractors 62-62C is not blocked by cargo within the cargo area.

Generally, a venting method utilizing any of the air extractors 62-62C includes using a back panel of a cab as a front wall of a cargo area within a bed of a unibody truck. The method then includes venting air from a passenger compartment of the unibody truck through an air extractor that is held by the back panel. The air vented through the air extractor is vented to an area that is outside the cargo area of the bed. The air can be vented through the air extractor through an area that is vertically beneath a floor of the bed, or outboard the cargo bed area.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An air venting system, comprising:
   a box of a truck, the box providing a cargo area;
   a cab back panel of the truck, the cab back panel having an exposed section that provides a front wall of the cargo area, the cab back panel having a hidden section outside the cargo area; and
   an air extractor held within the hidden section of the cab back panel.

2. The air venting system of claim 1, wherein the air extractor opens to an area that is outside the cargo area such that the air extractor is configured to vent air from a passenger compartment of the truck to an area that is outside the cargo area.

3. The air venting system of claim 1, wherein the air extractor is held within the hidden section of the cab back panel at a position that is vertically beneath a floor of the box such that the air extractor is configured to vent air from a passenger compartment of the truck to an area vertically beneath the floor of the box.

4. The air venting system of claim 3, wherein the floor of the box is vertically elevated relative to a floor of the passenger compartment.

5. The air venting system of claim 1, wherein the air extractor is held within the hidden section of the cab back panel at a position that is outboard of the cargo area such that the air extractor is configured to vent air from a passenger compartment of the truck to an area outboard the cargo area.

6. The air venting system of claim 5, further comprising a side wall of the box, the side wall having an inner panel and an outer panel, the air extractor opening to an area between the inner panel and the outer panel such that the air extractor is configured to vent air from the passenger compartment to the area between the inner panel and the outer panel.

7. The air venting system of claim 6, wherein the outer panel includes a rear wheel opening that communicates air from the area between the inner panel and the outer panel to an area outside the truck.

8. The air venting system of claim 5, wherein the air extractor a side air extractor, and further comprising a lower air extractor that is held within another portion of the hidden section of the cab back panel at a position that is vertically beneath a floor of the box such that the lower air extractor is configured to vent air from a passenger compartment of the truck to an area vertically beneath the floor of the box.

9. The air venting system of claim 8, wherein the side air extractor is a driver side air extractor that is configured to vent air from the passenger compartment to the area between the inner panel and the outer panel on a driver side of the cargo area, and further comprising a passenger side air extractor that is held within another portion of the hidden section and is configured to vent air from the passenger compartment to an area that is between an inner panel and an outer panel of a side wall on a passenger side of the cargo area.

10. The air venting system of claim 1, wherein the air extractor is configured to vent air from the passenger compartment into an interior of a cross-member that extends in a cross-vehicle direction, the cross-member having a box section.

11. The air venting system of claim 10, wherein the air extractor is a lower air extractor and the cross-member is a lower cross-member, and further comprising an upper air extractor held within the exposed section of the cab back panel and configured to vent air from the passenger compartment into an interior of an upper cross-member that extends in a cross-vehicle direction.

12. The air extractor of claim 11, wherein the hidden section of the cab back panel provides one side of the lower cross-member, and the exposed section of the cab back panel provides one side of the upper cross-member.

13. The air venting system of claim 1, wherein the exposed section of the cab back panel is exposed within the cargo area and is uncovered by any bed liner.

14. The air venting system of claim 1, wherein the truck has a unibody construction.

15. The air venting system of claim 1, wherein, along a longitudinal axis of the truck, the air extractor is radially outside the cargo area.

16. The air venting system of claim 1, wherein the air extractor opens to an area that is outside a forward boundary of the cargo area along a longitudinal axis of the truck, wherein the air extractor opens to an ambient area that is beneath a floor of the box.

17. The air venting system of claim 1, wherein the exposed section and the hidden section are sections of a common panel.

18. The air venting system of claim 1, wherein, along a longitudinal axis of the truck, the hidden section is radially outside the cargo area.

19. The air venting system of claim 1, wherein the exposed section provides at least a portion of a rearmost panel of a passenger compartment of the truck.

20. An air venting system, comprising:
a box of a truck, the box providing a cargo area;
a cab back panel of the truck, the cab back panel having an exposed section that provides a front wall of the cargo area and at least a portion of a rearmost panel of a passenger compartment of the truck, the cab back panel having a hidden section that extends below and outboard of the cargo area; and
an air extractor held within the hidden section of the cab back panel.

* * * * *

UNITED STATES PATENT AND TRADEMARK OFFICE
CERTIFICATE OF CORRECTION

PATENT NO. : 12,257,879 B2
APPLICATION NO. : 16/889186
DATED : March 25, 2025
INVENTOR(S) : Gray et al.

Page 1 of 1

It is certified that error appears in the above-identified patent and that said Letters Patent is hereby corrected as shown below:

In the Claims

Claim 8, Column 7, Line 24, change "a side" to --is a side--.

Claim 9, Column 7, Lines 33 to 34, change "the inner panel and the outer panel on a driver side of the cargo area" to --an inner panel and an outer panel of a side wall on a driver side of the cargo area--.

Claim 10, Column 7, Line 41, change "the passenger" to --a passenger--.

Signed and Sealed this
Twenty-ninth Day of April, 2025

Coke Morgan Stewart
*Acting Director of the United States Patent and Trademark Office*